(No Model.)
C. A. HASKINS.
DISH WASHER.
No. 329,452. Patented Nov. 3, 1885.
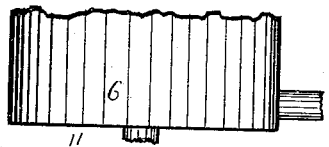
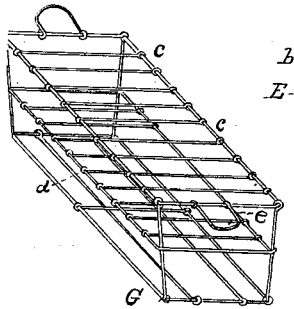
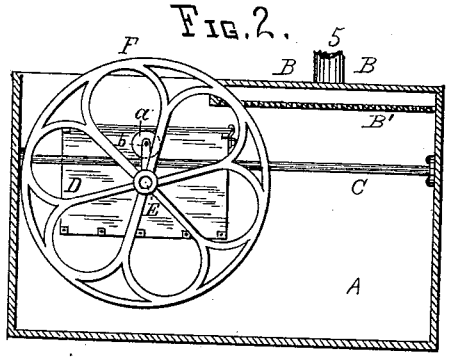
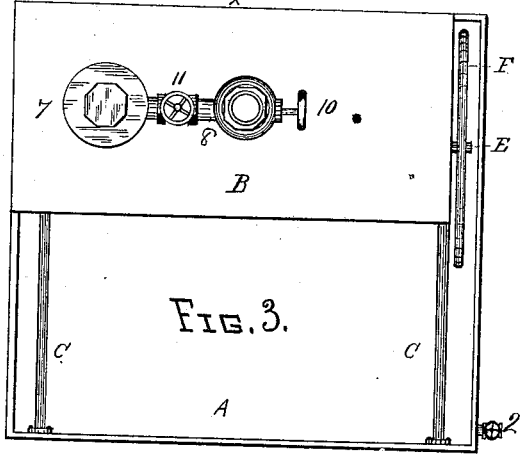
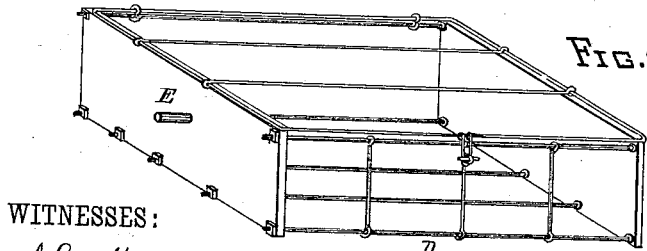
WITNESSES:
A. G. Morey
Jackson Wilsey
INVENTOR
Charles A. Haskins
BY J. L. Chapin
ATTORNEY

UNITED STATES PATENT OFFICE.

CHARLES A. HASKINS, OF CHICAGO, ILLINOIS.

DISH-WASHER.

SPECIFICATION forming part of Letters Patent No. 329,452, dated November 3, 1885.

Application filed April 16, 1884. Serial No. 128,150. (No model.)

*To all whom it may concern:*

Be it known that I, CHARLES A. HASKINS, a citizen of the United States, residing at Chicago, county of Cook, and State of Illinois, have invented new and useful Improvements in Dish-Washers, of which the following is a specification, reference being had to the accompanying drawings, illustrating the invention, in which—

Figure 1 is a front elevation of a dish-washer embodying my improvements; Fig. 2, a sectional elevation thereof on lines $xx$, Fig. 1; Fig. 3, a plan view; Fig. 4, a perspective view of the rotary tray-receptacle; Fig. 5, a perspective view of the plate-tray; Fig. 6, a perspective view of cup and dish trays.

The purpose of this invention is to provide simple and effectual means for washing dishes in large quantities, where trays are employed to hold the dishes, and hot water and soda-water are separately supplied for that purpose.

The nature of the invention will be comprehended by the following detailed description. The trays G H are formed with large interstices between the wires of the frame, so that water will freely come in contact with the dishes, and they are placed in a tray-receptacle, D, which is made of open wire-work and placed in a tank, A, and by means of a crank or gear, F, is oscillated under a running stream or spray of water coming through the perforated bottom B' of a water-chamber, B, located between the hot-water boiler 6 and the wash-tank. The tray-receptacle D is composed of a wire body and a wire cover to hold the trays in position to rotate or oscillate, and is hung to slide on a track, C, whereby it may be brought under the spray of water, and also brought to the open-topped portion of the wash-tank for placing the trays in the receptacle or removing them therefrom. The trays, as shown at Figs. 5 and 6, are formed with partitions $d$, to hold the dishes of a kind separate, and to prevent breakage, and to allow the water to pass freely between them. The assortment of the dishes being made when they are removed from the table, no difficulty is found in returning them from the washer. The body of the wash-box is shown at A and the semi-cover at B, and the cock for discharging the water is shown at 2, Figs. 1 and 3. The semi-cover forms the top of a water-chamber, which has a perforated bottom, B', freely to admit a spray or numerous small streams of water to pass onto the receptacle D from pipe 5, leading to a hot-water tank or boiler, 6.

The means for regulating the supply of soda consists of a separate receptacle, 7, which is connected with the pipe 5 by pipes 8 and 9 and cocks 10 11 12, which may be so turned as to pass all or a part of the hot water through pipe 8, soda-receptacle 7, and pipe 9 into the wash-box A, or all the water through the pipe 5 free from soda to rinse the dishes after they are cleansed from grease. The flow of water is to be such as to keep the perforated spray-box sufficiently full to have the water ejected onto all parts of the tray-receptacle D alike. Tracks C C are attached to the inside of the wash-box A, and on them are placed traveling wheels $a$ $a$, which are journaled to stirrups $b$ $b$, through the lower ends of which the journals E E of the tray-receptacle D pass and have bearing-supports, that the receptacle may have an oscillating movement under the spray. This movement is attained by means of a wheel, F, attached to the end of one of the journals E, and made large enough to project above the top of the wash-box, so as to be conveniently turned without the operator coming in contact with the water, a suitable space being left between the water-box B B' and the side of the box A for this wheel to pass through. The cock 2 at the bottom of the wash-box permits the dirty water to pass out as fast as required to be freed from coming in contact with dishes a second time. The advantages of this construction and arrangement are the dispatch and order with which a large amount of dishes can be washed, the cheapness of the apparatus, and the cost of cleaning.

I claim and desire to secure by Letters Patent of the United States—

1. The hot-water tank or boiler 6, soda-receptacle 7, connected by pipes and cocks, as specified, in combination with the spray-box B B', for ejecting streams of water evenly onto the tray-receptacle, as specified.

2. The tray-receptacle D, in combination with the track C C, wash-box A, tank 6 and spray-box B B', wheel F, and rollers *a a* with the tank 6, substantially as specified.

3. The trays G H, one or more constructed in suitable compartments to hold different styles of dishes, in combination with the traveling and oscillating tray-receptacle D, the tank 6, and spray-box B B', substantially as specified and shown.

CHARLES A. HASKINS.

Witnesses:
A. G. MOREY,
G. L. CHAPIN.